United States Patent
Teshima et al.

(10) Patent No.: US 9,490,462 B2
(45) Date of Patent: Nov. 8, 2016

(54) SEPARATOR AND NONAQUEOUS ELECTROLYTIC SECONDARY BATTERY INCLUDING THE SAME

(71) Applicant: GS Yuasa International Ltd., Kyoto-shi, Kyoto (JP)

(72) Inventors: Minoru Teshima, Kyoto (JP); Sumio Mori, Kyoto (JP); Akihiko Miyazaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 457 days.

(21) Appl. No.: 13/687,418

(22) Filed: Nov. 28, 2012

(65) Prior Publication Data

US 2013/0143089 A1  Jun. 6, 2013

(30) Foreign Application Priority Data

Dec. 1, 2011  (JP) ................. 2011-263886

(51) Int. Cl.
*H01M 2/16* (2006.01)
*H01M 10/052* (2010.01)
*H01M 10/0587* (2010.01)

(52) U.S. Cl.
CPC ............ *H01M 2/16* (2013.01); *H01M 2/1686* (2013.01); *H01M 10/052* (2013.01); *H01M 10/0587* (2013.01); *H01M 2/164* (2013.01); *H01M 2/1646* (2013.01); *Y02E 60/122* (2013.01)

(58) Field of Classification Search
CPC ........................ H01M 2/16; H01M 164/1646
See application file for complete search history.

(56) References Cited

U.S. PATENT DOCUMENTS

| | | | |
|---|---|---|---|
| 5,750,282 A * | 5/1998 | Chi et al. | 429/49 |
| 2002/0028380 A1* | 3/2002 | Tanjo et al. | 429/209 |
| 2006/0199294 A1* | 9/2006 | Fujikawa | H01M 2/16 438/42 |
| 2007/0238017 A1* | 10/2007 | Call et al. | 429/145 |
| 2009/0155697 A1* | 6/2009 | Park et al. | 429/339 |
| 2010/0239897 A1* | 9/2010 | Sumihara et al. | 429/94 |
| 2011/0274981 A1* | 11/2011 | Yamada et al. | 429/303 |

FOREIGN PATENT DOCUMENTS

| | | |
|---|---|---|
| JP | 6267528 A2 | 9/1994 |
| JP | 10-050287 | 2/1998 |
| JP | 1074502 | 3/1998 |
| JP | 10189026 A2 | 7/1998 |
| JP | 2005-353452 | 12/2005 |

(Continued)

*Primary Examiner* — Jeremiah Smith
(74) *Attorney, Agent, or Firm* — Rankin, Hill & Clark LLP (57) ABSTRACT

A separator for a battery according to the present disclosure (present separator) is held between a positive electrode and a negative electrode of the battery and includes an inorganic layer formation part and an inorganic layer non-formation part formed at an end. In addition, a nonaqueous electrolytic secondary battery according to the present disclosure includes: an electrode assembly including: a positive electrode having an active material layer including a positive electrode active material and a positive electrode current collector foil exposure part; a negative electrode having an active material layer including a negative electrode active material and a negative electrode current collector foil exposure part; and the present separator held between the positive electrode and the negative electrode; a case for housing the electrode assembly; and an electrolyte held between the positive electrode and the negative electrode.

10 Claims, 6 Drawing Sheets

(56) References Cited

FOREIGN PATENT DOCUMENTS

| JP | 200718861 | 1/2007 |
| JP | 2008-140551 | 6/2008 |
| JP | 2008-243660 | 10/2008 |
| JP | 2008-270178 | 11/2008 |
| JP | 2011159434 A2 | 8/2011 |
| JP | 2011181358 A2 | 9/2011 |
| JP | 2011-204585 | 10/2011 |

* cited by examiner

SEPARATOR AND NONAQUEOUS ELECTROLYTIC SECONDARY BATTERY INCLUDING THE SAME

CROSS-REFERENCE TO RELATED APPLICATION

This application is based on Japanese Patent Application No. 2011-263886 filed with the Japan Patent Office on Dec. 1, 2011, the entire content of which is hereby incorporated by reference.

BACKGROUND

1. Technical Field

The present disclosure relates to a separator, and a nonaqueous electrolytic secondary battery, such as a lithium ion battery, including the same.

2. Related Art

A nonaqueous electrolytic secondary battery such as a lithium ion battery includes an electrode assembly and a case for housing the electrode assembly. The electrode assembly is a stack of a positive electrode, a negative electrode, and a separator interposed therebetween. The electrode assembly is housed in the case in a state that the electrode assembly is wound. An electrolyte is held between the positive electrode and the negative electrode.

One surface or both surfaces of the separator interposed between the positive electrode and the negative electrode of the nonaqueous electrolytic secondary battery is/are coated with a mixture including an inorganic particle and a binder. Application of this mixture provides the separator with an inorganic layer. The porosity of this inorganic layer per unit area is higher than the porosity of a polyolefin layer of the separator. Therefore, the inorganic layer is capable of holding a larger amount of electrolytic solution. The inorganic layer thus contributes to improvement of durability of the separator. The separator has a function to hold the electrolyte. The separator further has a function to prevent short-circuiting due to contact between the positive electrode and the negative electrode.

When a nonaqueous electrolytic secondary battery is left under high temperature or subjected to repeated charge-discharge cycles, the electrolyte existing between the positive electrode and the negative electrode moves to a dead space between the case and the electrode assembly. This results in decrease in the absolute amount of the electrolyte between the electrodes. It therefore leads to a problem of deterioration in durability of the secondary battery.

In a nonaqueous electrolytic secondary battery disclosed in JP-A-2005-353452, the pore ratio of a portion closer to a case is lower than the pore ratio of a portion far from the case. In other words, in the winding type, the pore ratio of a portion of an electrode group that is closer to an end thereof in the short-side direction is lower than that of an inner portion.

An object of the structure of this secondary battery is to improve the function of the separator to hold the electrolyte. However, for achieving this structure, the pore ratio of the separator itself needs to be changed for every portion. This makes it difficult to assemble the electrode assembly and fabricate the separator.

JP-A-2008-140551 discloses a stacked nonaqueous electrolytic secondary battery. In this secondary battery, the periphery of the separator includes a low-pore-ratio part having the lower pore ratio than the other portions.

The structure disclosed in JP-A-2008-140551 has been made in consideration that short-circuiting between a positive electrode active material layer and a negative electrode active material layer intensively occurs in the periphery. That is, falloff of a conductive particle from the periphery of the active material layer is suppressed by making the pore ratio of the periphery of the separator lower than that of the other portions. This can prevent the short-circuiting between the positive electrode active material layer and the negative electrode active material layer. In other words, in this structure, it is difficult to improve the function of the separator to hold the electrolyte. The pore ratio of the separator is hereinafter referred to as porosity.

In the technique proposed in JP-A-H10-50287, a microporous film having heat resistance is stacked on a surface of a separator. This suppresses contraction of the separator during high-temperature treatment. Moreover, in the technique disclosed in JP-A-2008-243660, a contraction suppression layer for a separator is not formed at a portion where a positive electrode current collector exposure part and a negative electrode current collector exposure part face each other. For this reason, the current collector exposure parts are brought into contact with each other due to contraction of the current collector exposure parts during high-temperature treatment. This leads to early decrease in potential of the positive electrode. Therefore, reliability of the battery is improved. The function of the separator to hold the electrolyte is therefore hardly improved even with this technique.

SUMMARY

A separator for a battery according to the present disclosure (present separator) is held between a positive electrode and a negative electrode of the battery and includes an inorganic layer formation part and an inorganic layer non-formation part formed at an end.

In addition, a nonaqueous electrolytic secondary battery according to the present disclosure includes: an electrode assembly including: a positive electrode having an active material layer including a positive electrode active material and a positive electrode current collector foil exposure part; a negative electrode having an active material layer including a negative electrode active material and a negative electrode current collector foil exposure part; and the present separator held between the positive electrode and the negative electrode; a case for housing the electrode assembly; and an electrolyte held between the positive electrode and the negative electrode.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An embodiment according to the present disclosure will be described with reference to the accompanying drawings. In the following description, some terms indicating particular direction and position (for example, "side" and "end") are used as necessary. These terms are used for helping understanding of the embodiment in accordance with the drawings. The technical scope of the present disclosure is not limited by the meaning of those terms. Furthermore, the following description is just an example essentially and is not intended to limit the present disclosure, the application, or the use.

Figure 1:
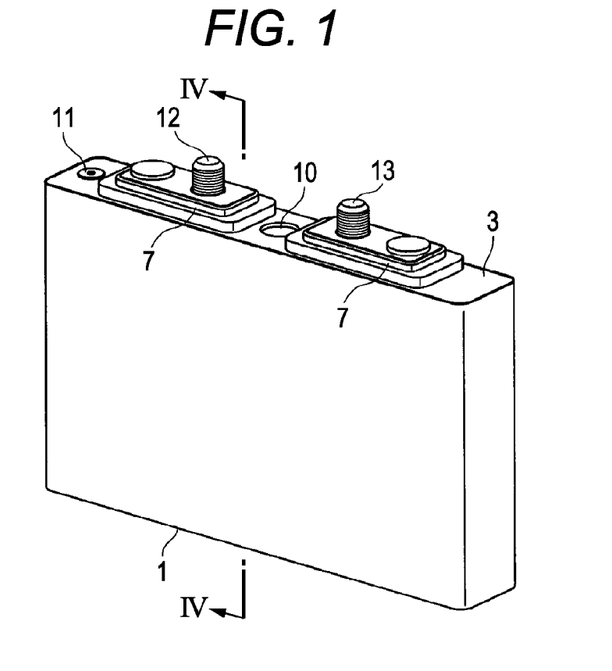
FIG. 1 is a perspective view of a winding type battery according to the present embodiment.
Figure 2:
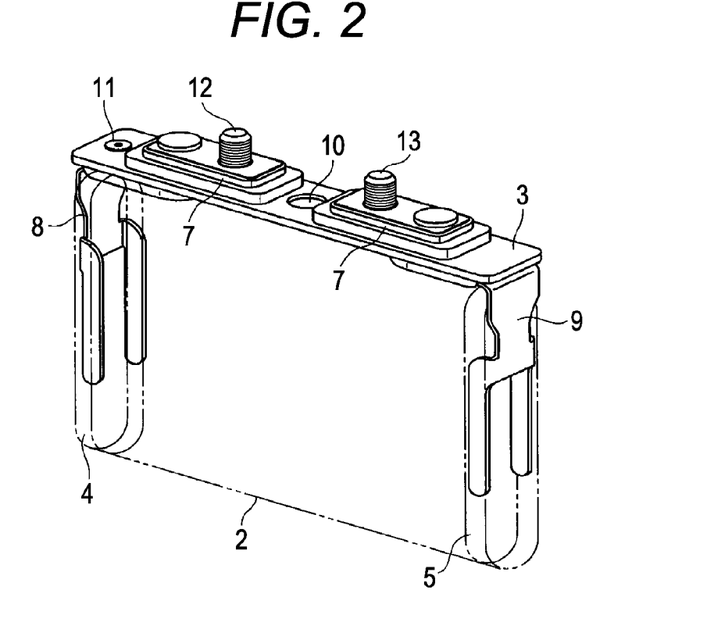
FIG. 2 is a perspective view of a main part of the battery depicted in FIG. 1.

FIG. 1 depicts a winding type nonaqueous electrolytic secondary battery. FIG. 2 depicts the inside of this nonaqueous electrolytic secondary battery (inside of a battery case 1). As depicted in FIG. 1 and FIG. 2, this nonaqueous electrolytic secondary battery includes the battery case 1, an electrode assembly 2 housed in the battery case 1, and a lid body 3 for sealing the battery case 1. The exterior body of the secondary battery includes the battery case 1 and the lid body 3.

The battery case 1 has a shape of a cuboid with its top open. The material of the battery case 1 includes aluminum and aluminum alloy, for example.

Figure 3:
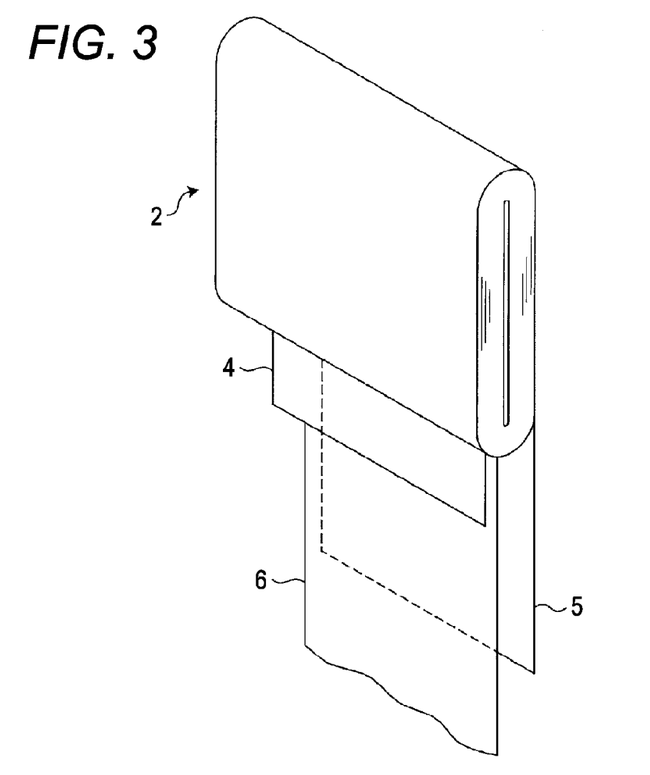
FIG. 3 is a magnified perspective view of an electrode assembly of the battery depicted in FIG. 1.
Figure 4:
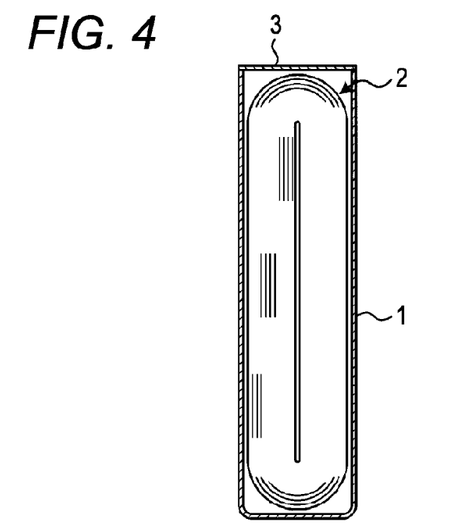
FIG. 4 is a cross-sectional view taken along the line IV-IV of FIG. 1.

FIG. 3 depicts the electrode assembly 2. FIG. 4 is a cross-sectional view taken along the line IV-IV in FIG. 1. The electrode assembly 2 includes a negative electrode 4, a positive electrode 5, and a separator 6 disposed between the negative electrode 4 and the positive electrode 5 as depicted in FIG. 3 and FIG. 4. The electrode assembly 2 includes the positive electrode 5, the negative electrode 4, and the separator 6, which are overlapped on one another and wound. The electrode assembly 2 is wound in flat form so that the electrode assembly 2 can be housed in the battery case 1.

Figure 5A:
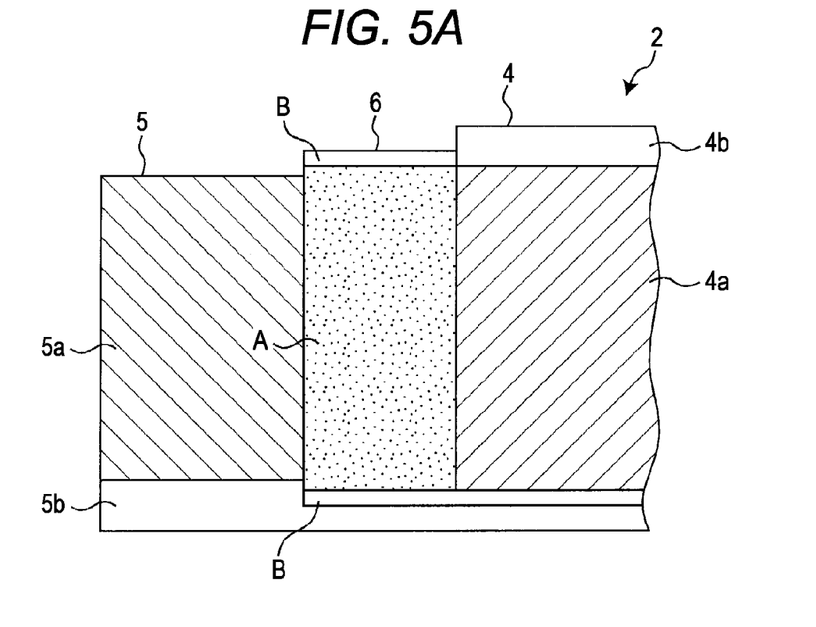
FIG. 5A is a development view depicting an example of an electrode assembly including a separator having inorganic layer non-formation parts on both sides.
Figure 5B:
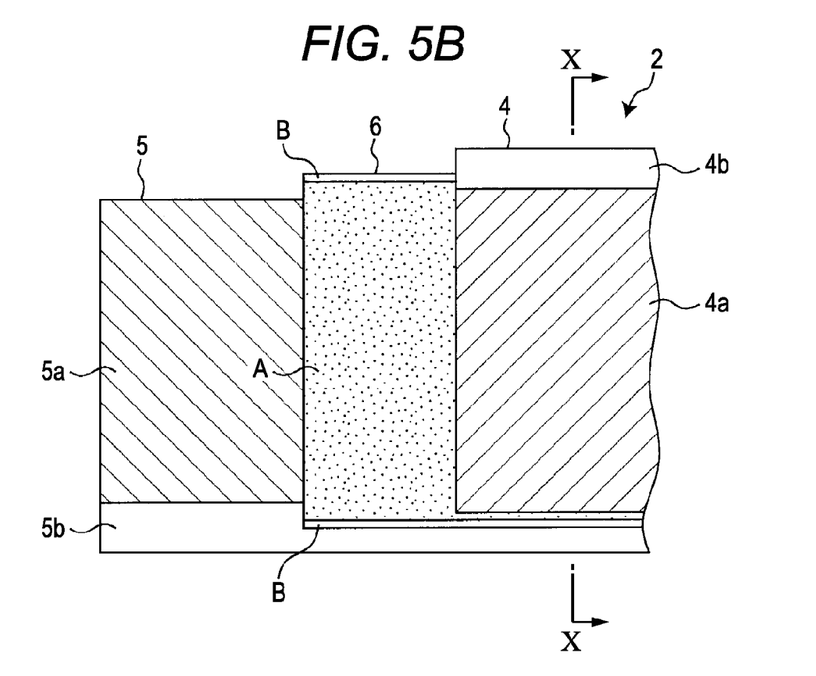
FIG. 5B is a development view depicting another example.

The negative electrode 4 includes a negative electrode active material layer 4a and a current collector foil exposure part 4b as depicted in FIG. 5A and FIG. 5B. The negative electrode active material layer 4a is a layer including a negative electrode active material formed on a current collector foil (copper foil), which is a base of the negative electrode 4. The current collector foil exposure part 4b is a portion which does not include any negative electrode active material and where the current collector foil is exposed. This portion is formed at one end of the negative electrode 4 in the width direction.

Similarly, the positive electrode 5 includes a positive electrode active material layer 5a and a current collector foil exposure part 5b. The positive electrode active material layer 5a is a layer including a positive electrode active material formed on a current collector foil (aluminum foil), which is a base of the positive electrode 5. The current collector foil exposure part 5b is a portion which does not include the positive electrode active material and where the current collector foil is exposed. This portion is formed at one end of the positive electrode 5 in the width direction on a side of the positive electrode 5 opposite to the position where the current collector foil exposure part 4b of the negative electrode 4 is formed.

The separator 6 includes an inorganic layer formation part A in the center in the width direction and inorganic layer non-formation parts B at both ends in the width direction. The inorganic layer formation part A includes a porous resin film, which is a base of the separator 6, and an inorganic layer including an inorganic particle and a binder formed on the porous resin film. The inorganic layer non-formation part B includes the resin film but does not include the inorganic layer. The inorganic layer non-formation part B is provided to a part of the separator 6 that is on the current collector foil exposure part 4b side of the negative electrode 4 and that does not face the negative electrode active material layer 4a, and a part of the separator 6 that is on the current collector foil exposure part 5b side of the positive electrode 5 and that does not face the negative electrode active material layer 4a.

The current collector foil exposure part 4b of the negative electrode 4 of the electrode assembly 2 is bound and connected to a negative electrode current collector 8 depicted in FIG. 2 via a clip (not shown). The current collector foil exposure part 5b of the positive electrode 5 is bound and connected to a positive electrode current collector 9 depicted in FIG. 2 via a clip (not shown).

As depicted in FIG. 1, the lid body 3 is made of metal and has a plate-like shape. A safety valve 10 is provided in the center of the lid body 3. A first end portion of the lid body 3 is provided with a stopper body 11 for preventing leakage from a liquid injection hole (not shown). The first end portion of the lid body 3 is also provided with a negative electrode external terminal 12 in electrical connection with the negative electrode current collector 8 via a packing 7. A second end portion of the lid body 3 is provided with a positive electrode external terminal 13 in electrical connection with the positive electrode current collector 9 via the packing 7.

Because the inorganic layer formation part A of the separator 6 of the electrode assembly 2 has the inorganic layer, the inorganic layer formation part A has higher porosity than the inorganic layer non-formation part B. Thus, more electrolytes can be held in a part of the inorganic layer formation part A of the separator 6 that faces the active material layer 4a of the negative electrode 4 and the active material layer 5a of the positive electrode 5. Therefore, the capacity holding ratio when the secondary battery is left under high temperature is increased. Accordingly, the durability of the secondary battery is improved.

The inorganic layer non-formation part B of the separator 6 has lower porosity and lower electrolyte-holding ability, compared with the inorganic layer formation part A. However, the inorganic layer non-formation part B does not face (does not overlap with) the active material layer 4a of the negative electrode 4 or the active material layer 5a of the positive electrode 5. The inorganic layer non-formation part B hardly contributes to charge-discharge reaction. Therefore, the inorganic layer non-formation part B does not need to hold extra electrolytes.

In this manner, the separator 6 has the inorganic layer formation part A with high porosity in the center in the width direction, and the inorganic layer non-formation parts B with low porosity at the both ends in the width direction. As a result, the inorganic layer formation part A used in the charge-discharge reaction can selectively hold sufficient electrolytes.

The inorganic layer formation part A may have porosity of 35% or more. This increases the liquid injection property of the electrolytic solution at fabrication of the battery. In addition, the inorganic layer formation part A may have porosity of 85% or less. This can reduce thermal contraction of the entire separator 6.

The inorganic layer non-formation part B may have porosity of 30% or more. This increases the liquid injection property of the electrolytic solution at fabrication of the battery. In addition, the inorganic layer non-formation part B may have porosity of 80% or less. This can increase the ratio of filling the inorganic layer with the inorganic particles sufficiently. As a result, the effect of suppressing the contraction of the separator is improved.

The difference "PA–PB" between the porosity PA of the inorganic layer formation part A and the porosity PB of the inorganic layer non-formation part B is preferably 1 or more and 20 or less, and more preferably 2 or more and 15 or less. The "PA–PB" of preferably 1 or more, or more preferably 2 or more leads to improvement in penetration property of the electrolytic solution from the inorganic layer non-formation part B to the inorganic layer formation part A. The "PA–PB" of preferably 20 or less, or more preferably 15 or less leads to sufficient increase in the porosity of the inorganic layer non-formation part (resin film) B. Thus, the film permeability of the separator 6 is improved. As a result, the battery with high output performance can be provided. In addition, the "PA–PB" of preferably 20 or less, or more preferably 15 or less can prevent the porosity of the inorganic layer from becoming too high. Thus, the thermal contraction property of the separator 6 can be sufficiently secured.

On the current collector foil exposure part 4b side of the negative electrode 4 or on the current collector foil exposure part 5b side of the positive electrode 5, the ratio (facing ratio) of the width of a part of the inorganic layer non-formation part B that does not face the negative electrode active material layer 4a to the width of a part of the separator 6 that does not face the negative electrode active material layer 4a is preferably 2% or more. If this facing ratio is less than 2%, the region of the inorganic layer non-formation part B with low porosity becomes narrow. As a result, the electrolyte held by the inorganic layer formation part A moves outward in the width direction more easily. Thus, it becomes difficult to hold sufficient electrolytes in the portion (facing portion) where the separator 6 overlaps with the active material layer 4a of the negative electrode 4 or the active material layer 5b of the positive electrode 5.

FIG. 5A depicts an example of the separator 6 with the facing ratio of 100%, while FIG. 5B depicts an example of the separator 6 with the facing ratio of 50%.

In this manner, the separator 6 is provided with the inorganic layer non-formation part B with low porosity outside the inorganic layer formation part A with high porosity. This kind of structure prevents the electrolyte held in the inorganic layer formation part A of the separator 6 between the negative electrode 4 and the positive electrode 5 from moving outward in the width direction of the separator 6. Such a structure also prevents the electrolyte from flowing out into a space between the case 1 and the electrode assembly 2. As a result, the capability of the electrode assembly 2 to hold the electrolyte is improved. Moreover, significant decrease in amount of electrolyte occurs outside the electrode assembly 2 and inside the case 1. Therefore, it leads to increase in capacity holding ratio of the secondary battery while the battery is left under high temperature. Therefore, the durability of the secondary battery is improved.

Moreover, when the battery is used under high-temperature environment, the electrolyte in the separator is generally decomposed to generate gas. In this case, gas collection or the like causes shortage of the electrolyte in the electrode assembly, resulting in decrease in battery capacity. In the secondary battery according to the present disclosure, the inorganic layer non-formation parts B at the both ends of the separator 6 have low porosity. This easily causes a capillary action. Due to this capillary action, the electrolyte existing in the dead space between the case 1 and the both ends of the electrode assembly 2 is supplied to the inside of the separator 6. As a result, the capacity holding ratio of the secondary battery is increased, and the durability of the secondary battery is improved.

Figure 6:
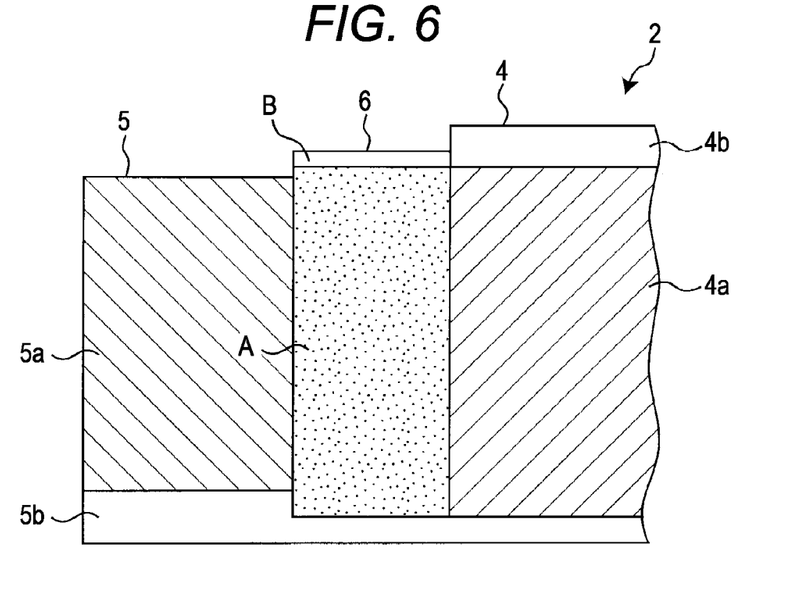
FIG. 6 is a development view depicting an example of an electrode assembly including a separator having an inorganic layer non-formation part on one side.

In the above embodiment, the inorganic layer non-formation parts B are provided at the both ends of the separator 6. However, as depicted in FIG. 6, the inorganic layer non-formation part B may be provided on one side of the separator 6 (for example, on the current collector foil exposure part 4b side of the negative electrode 4, or on the current collector foil exposure part 5b side of the positive electrode 5).

The secondary battery according to the above embodiment is a winding type nonaqueous electrolytic secondary battery. Alternatively, the secondary battery according to the present disclosure may be a stacked type nonaqueous electrolytic secondary battery.

Figure 7:
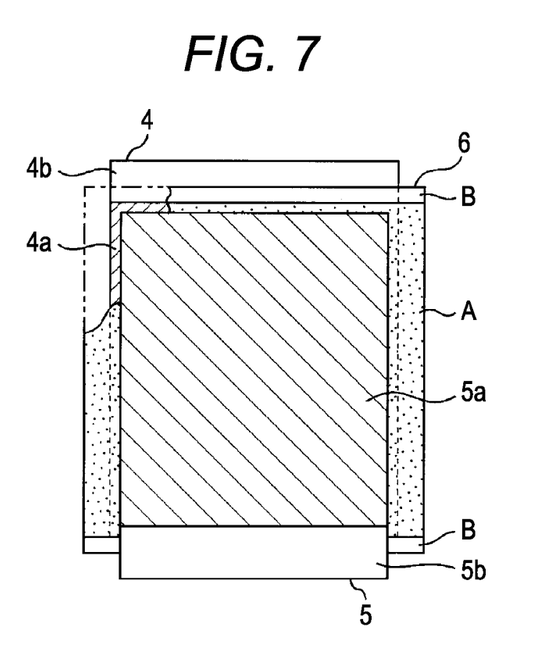
FIG. 7 is a plan view depicting an example of a stacked electrode assembly.

FIG. 7 depicts a stacked type nonaqueous electrolytic secondary battery according to the present disclosure. This secondary battery includes a plurality of negative electrodes 4, a plurality of positive electrodes 5, and a plurality of separators 6. Each of the negative electrodes 4, the positive electrodes 5, and the separators 6 has a rectangular shape. The electrode assembly 2 in this secondary battery includes a stack of subassemblies including the negative electrodes 4, the positive electrodes 5, and the separators 6. The current collector foil exposure part 4b of the negative electrode 4 and the current collector foil exposure part 5b of the positive electrode 5 are provided to the opposite sides of the rectangular shape. The inorganic layer non-formation parts B of the separator 6 are provided to the both ends of the separator 6 so as to overlap with the current collector foil exposure part 4b of the negative electrode 4 and the current collector foil exposure part 5b of the positive electrode 5. The inorganic layer non-formation part B may alternatively be provided to one end of the separator 6 (at an end overlapping with the current collector foil exposure part 4b or an end overlapping with the current collector foil exposure part 5b). Alternatively, the inorganic layer non-formation part B may be provided to the entire periphery of the separator 6.

Figure 8:
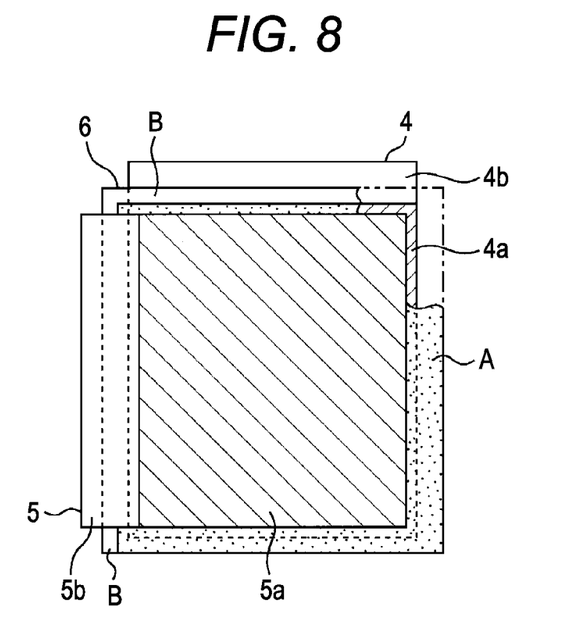
FIG. 8 is a plan view depicting another example of a stacked electrode assembly.

FIG. 8 depicts another stacked type nonaqueous electrolytic secondary battery according to the present disclosure. In this secondary battery, the current collector foil exposure part 4b is provided so as to extend along one side of the rectangular negative electrode 4. The current collector foil exposure part 5b is provided so as to extend along a side of the rectangular positive electrode 5, which is orthogonal to the direction where the current collector foil exposure part 4b extends. The inorganic layer non-formation part B of the separator 6 is provided so as to overlap with the current collector foil exposure part 4b of the negative electrode 4 and the current collector foil exposure part 5b of the positive electrode 5. The inorganic layer non-formation part B may alternatively be provided so as to overlap with the side of the negative electrode 4 that faces the side provided with the current collector foil exposure part 4b. Furthermore, the inorganic layer non-formation part B may alternatively be provided so as to overlap with the side of the positive electrode 5 that faces the side provided with the current collector foil exposure part 5b. The inorganic layer non-formation part B may alternatively be provided to the entire periphery of the separator 6.

Figure 9:
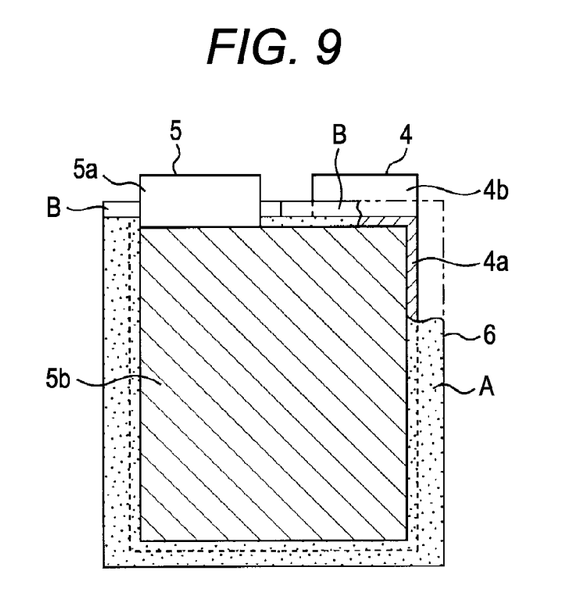
FIG. 9 is a plan view depicting another example of a stacked electrode assembly.

FIG. 9 depicts another stacked type nonaqueous electrolytic secondary battery according to the present disclosure. In this secondary battery, the current collector foil exposure part 4b is provided to a part of one side of the rectangular negative electrode 4. The current collector foil exposure part 5b is provided to a part of a side of the rectangular positive electrode 5 that corresponds to the current collector foil exposure part 4b so as not to overlap with the current collector foil exposure part 4b. The inorganic layer non-formation part B of the separator 6 is provided along one side of the separator 6 so as to overlap with the current collector foil exposure part 4b of the negative electrode 4 and the current collector foil exposure part 5b of the positive electrode 5. However, the inorganic layer non-formation part B may alternatively be provided along another side of the separator 6. Further alternatively, the inorganic layer non-formation part B may be provided to the entire periphery of the separator 6.

Examples

For confirming the effect of the present disclosure, examples of the present disclosure and a comparative example thereof were prepared. Secondary batteries according to the examples each include the aforementioned negative electrode 4, positive electrode 5, and separator 6. The inorganic layer non-formation part B is provided to the separator 6 so as to overlap with the negative electrode current collector foil exposure part 4b and the positive electrode current collector foil exposure part 5b. In each example, the ratio of the width of the part of the inorganic layer non-formation part B that does not face the negative electrode active material layer 4a to the width of the part of the separator 6 that does not face the negative electrode active material layer 4a is different. In the secondary battery in the comparative example, the separator 6 does not include an inorganic layer non-formation part B in the structure of the example. Results of comparing manufacturing methods according to the examples and the comparative example and the capacity holding ratios of the examples and the comparative example are shown below.

<Fabrication of Positive Electrode>

Positive electrode mixture paste was prepared. This positive electrode mixture paste includes 86 mass % of LiCo$_{1/3}$Ni$_{1/3}$Mn$_{1/3}$O$_2$ as a positive electrode active material, 6 mass % of acetylene black as a conduction auxiliary agent, 8 mass % of polyvinylidene fluoride (PVdF) as a binding agent, and N-methylpyrrolidone as a solvent. Both surfaces of a 20-μm-thick aluminum current collector foil were coated with this positive electrode mixture paste. Then, the aluminum current collector foil was dried under vacuum and then pressed for shaping by a roll press to provide the positive electrode 5.

<Fabrication of Negative Electrode>

Negative electrode mixture paste was prepared. This negative electrode mixture paste includes 95 mass % of hard carbon as a negative electrode active material, 5 mass % of PVdF, and N-methylpyrrolidone as a solvent. The interlayer distance d002 of hard carbon is 0.379 nm, and the average particle diameter d50 thereof is 9 μm. Both surfaces of a 10-μm-thick copper current collector foil were coated with this negative electrode mixture paste. Then, this copper current collector foil was dried under vacuum and then pressed for shaping by a roll press to provide the negative electrode 4.

<Fabrication of Electrolytic Solution>

Mixture solution was prepared by mixing ethylene carbonate (EC), dimethyl carbonate (DMC), and ethylmethyl carbonate (EMC) at the volume ratio of 30:20:50. Lithium hexafluorophosphate (LiPF$_6$) was dissolved at concentration of 0.8 mol/l in this mixture solution, and 0.2 mass % of 1,3-propene sultone was further added thereto to provide the electrolytic solution.

<Fabrication of Separator>

A surface of a polyolefin microporous film with the width of 150 mm and the thickness of 0.025 mm, which faces the positive electrode, excluding both ends thereof was coated with a mixture at the thickness of approximately 5 μm. This mixture contains an inorganic particle including alumina and a binder including polyvinylidene fluoride (PVDF). In this manner, the separator 6 including the inorganic layer non-formation part B and the inorganic layer formation part A, which is the part coated with the mixture, was formed. The inorganic layer formation part A may be formed by application such as coating or by sputtering.

<Fabrication of Battery>

The negative electrode 4, the positive electrode 5, and the separator 6 interposed therebetween were wound in flat form. Thus, the electrode assembly 2 was fabricated. After this electrode assembly 2 was welded with the lid body 3, to which the current collectors 8 and 9 have been attached in advance, the electrode assembly 2 was housed in the battery case 1 made of aluminum. After the battery case 1 and the lid body 3 are laser-welded, the electrolytic solution was injected through a liquid injection hole and the liquid injection hole was then sealed by welding. Thus, the nonaqueous electrolytic secondary battery according to the example having predetermined battery capacity was fabricated.

<Change of Ratio of Inorganic Layer Non-Formation Part of Separator>

The examples and the comparative example were prepared while varying the ratio (facing ratio) of the width of the inorganic layer non-formation part B (width of the part of the inorganic layer non-formation part B that does not face the negative electrode active material layer 4a) to the width of the part at the both ends of the separator 6 that does not face the negative electrode active material layer 4a when the separator 6 was fabricated.

In examples 1 to 4, the inorganic layer formation part A was provided so as to face the positive electrode 5. The inorganic layer non-formation parts B were provided to the both sides of the separator 6. The facing ratio was set to 2%, 10%, 50%, and 100% in the example 1, the example 2, the example 3, and the example 4, respectively.

In examples 5 to 8, the inorganic layer formation part A was provided so as to face the positive electrode 5. The inorganic layer non-formation part B was provided to the separator 6 on the negative electrode 4 side (on the current collector foil exposure part 4b side). The facing ratio was set to 2%, 10%, 50%, and 100% in the example 5, the example 6, the example 7, and the example 8, respectively.

In example 9, the inorganic layer formation part A was provided so as to face the positive electrode 5. The inorganic layer non-formation part B was provided to the separator 6 on the positive electrode 5 side (on the current collector foil exposure part 5b side). The facing ratio in the example 9 was set to 50%.

In example 10, the inorganic layer formation part A was provided so as to face the negative electrode 4. The inorganic layer non-formation parts B were provided to the both sides of the separator 6. The facing ratio in the example 10 was set to 50%.

In example 11, the inorganic layer formation part A was provided so as to face both the negative electrode 4 and the positive electrode 5. The inorganic layer non-formation parts B were provided to the both sides of the separator 6. The facing ratio in the example 11 was set to 50%.

In example 12, the inorganic layer formation part A was provided so as to face both the negative electrode 4 and the positive electrode 5. The inorganic layer non-formation parts B were provided to the both sides of the separator 6. The facing ratio in the example 12 was set to 1%.

In examples 13 and 14, the inorganic layer formation part A was provided so as to face both the negative electrode 4 and the positive electrode 5. The inorganic layer non-formation parts B were provided to the both sides of the separator 6. Moreover, the difference in porosity "PA–PB" between the inorganic layer formation part A and the inorganic layer non-formation part B was varied. More specifically, the difference in porosity "PA–PB" was set to 1 in the example 13 and to 0 in the example 14. The facing ratios in the examples 13 and 14 were set to 100%.

In comparative example 1, the separator 6 does not have the inorganic layer non-formation part. In other words, in preparation of the comparative example 1, the inorganic layer was applied over the entire width of the separator 6.

<Observation of Inorganic Layer Non-Formation Part of Separator>

The inorganic layer non-formation part B of the separator 6 was observed by the following method.

Figure 10:
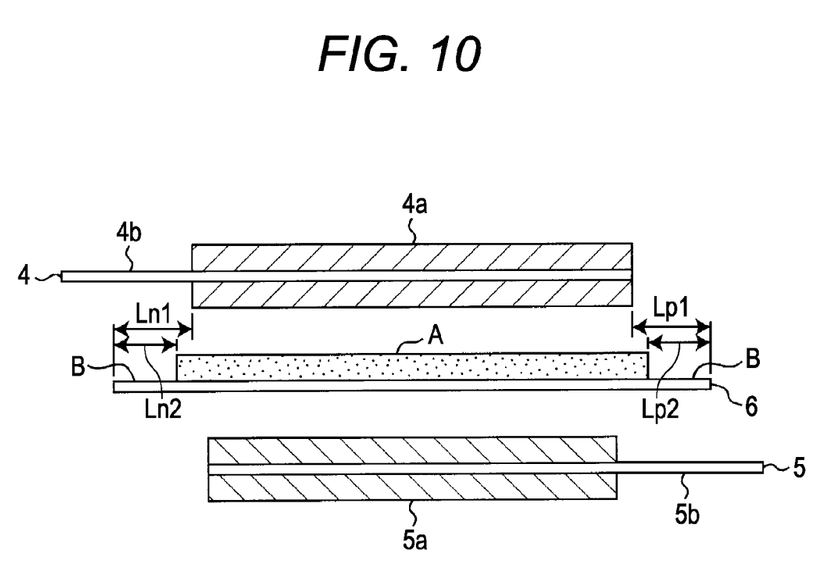
FIG. 10 is a cross-sectional view of a winding type electrode assembly taken along the line X-X in FIG. 5B.

(1) The battery is disassembled, and the width Ln1 of the part of the separator 6 on the negative electrode foil exposure part 4b side that does not face the negative electrode active material layer 4a and the width Lp1 of the separator 6 on the positive electrode foil exposure part 5b side that does not face the negative electrode active material layer 4a are measured by a ruler with the resolution of 0.5 mm (see FIG. 10). In measurement performed on the winding type battery, the width Ln1 and the width Lp1 of a central part of a flat part of the separator 6 interposed between the positive electrode 5 and the negative electrode 4 located outside the positive electrode 5 were measured for each periphery. Then, the mean value of the measurement results was obtained. In measurement performed on the stacked type battery, the width Ln1 and the width Lp1 of the central part of the separator 6 were measured for each layer. Then, the mean value of the measurement results was obtained.

(2) A part having the predetermined size in the vicinity of the central part of the separator 6 was taken as a sample. This sample was washed with dimethyl carbonate and then dried under vacuum at normal temperature. After that, the cross section of the separator 6 of the sample was exposed according to a known method such as an ion milling method or an argon sputtering method. The cross section of the separator 6 was observed with a SEM. Thus, the width Ln2 of the inorganic layer non-formation part B on the negative electrode foil exposure part 4b side was measured. Furthermore, the width Lp2 of the inorganic layer non-formation part B on the positive electrode foil exposure part 5b side was measured (see FIG. 10). In measurement performed on the winding type battery, samples were taken from the central part of the flat part of the separator 6 located outside the positive electrode 5 in the outermost periphery (ranging from the outer peripheral end to ⅓ of the entire length of the positive electrode plate), an inner periphery (ranging from ⅓ to ⅔ of the entire length of the positive electrode plate), and an inner periphery (ranging from ⅔ of the entire length of the positive electrode plate to the inner peripheral end). Each sample was observed with a SEM. The values of Ln2 and Lp2 are the mean value of 2N.

(3) The facing ratio Hn (%) of the inorganic layer non-formation part B on the negative electrode foil exposure part 4b side and the facing ratio Hp (%) of the inorganic layer non-formation part B on the positive electrode foil exposure part 5b side were calculated using the following formulae:

$$Hn(\%)=Ln2/Ln1*100$$

$$Hp(\%)=Lp2/Lp1*100.$$

When the inorganic layers are provided to the both surfaces of the separator 6, Hn and Hp for the both surfaces are calculated and the larger value is used as the facing ratio of the inorganic layer non-formation part B. When the inorganic layer non-formation part B is provided to only one of the positive electrode foil exposure part 5b side and the negative electrode foil exposure part 4b side, one of Hn and Hp is used as the facing ratio. When the inorganic layer non-formation parts B are provided to both the positive electrode foil exposure part 5b side and the negative electrode foil exposure part 4b side, the mean value between Hn and Hp is used as the facing ratio of the inorganic layer non-formation part B.

<Measurement of Porosity>

In the examples 1 to 12 and the comparative example 1, the separator 6 is formed by coating the polyolefin microporous film with the same material and the same thickness with the inorganic layer with the same composition and the same thickness. Therefore, it is considered that the inorganic layer formation part A and the inorganic layer non-formation part B have the porosity equal to each other in the examples 1 to 12 and the comparative example 1. Thus, the separator of the example 1 was selected and its porosity was measured.

1. Measurement of Porosity of Inorganic Layer Formation Part A (1) The battery is disassembled and parts of the separator 6 are taken as samples. In measurement performed on the winding type battery, samples are taken from the central part of the flat part of the separator 6 located outside the positive electrode 5 in the outermost periphery (ranging from the outer peripheral end to ⅓ of the entire length of the positive electrode plate), an inner periphery (ranging from ⅓ to ⅔ of the entire length of the positive electrode plate), and an inner periphery (ranging from ⅔ of the entire length of the positive electrode plate to the inner peripheral end). In measurement performed on the stacked type battery, a sample is taken from the central part of the separator 6 of any layer selected from any region among three regions including ⅓ of the number of stacked layers. The size of the sample is arbitrary. In this example, the sample had the size of 4 cm×4 cm. The sample is washed with dimethyl carbonate, dried under vacuum at normal temperature, and used as a measurement sample.

(2) The weight per unit area W (g/cm$^2$) and the thickness D (μm) of the measurement sample are measured.

(3) The press-in amount per unit weight A (cc/g) of each sample in the examples 1 to 14 and the comparative example 1 is measured by a mercury press-in method using Micromeritics WIN9400 series. A mean value of 3 N or more was used as the value of the press-in amount A.

(4) The porosity is calculated based on the formula: porosity P (%)=A/(1/W*D/10000)*100.

2. Measurement of Porosity of Inorganic Layer Non-Formation Part (1) A measurement sample of the separator 6 including the inorganic layer is prepared in a manner similar to the measurement of the porosity of the inorganic layer formation part A.

(2) The weight of each sample after vacuum dry is measured and the weight per unit area Wa (g/cm$^2$) is calculated.

(3) Each sample is immersed in solution including water and ethanol at volume ratio (%) of 1:1 stored in a container. After that, each sample is washed with an ultrasonic wave together with the container. While the surface of the separator 6 is observed with an optical microscope at magnification of 5 to 500 times, the ultrasonic wave washing is continued until separation of the inorganic layer is confirmed. After the separation of the inorganic layer is confirmed, the sample is dried under vacuum at normal temperature for 2 hours or more. By measuring the weight of each sample, the weight per unit area Wb (g/cm$^2$) thereof after the ultrasonic wave washing is calculated.

(4) Mending tape, a product of 3M Company, is attached to a surface of the inorganic layer of the sample (coated sample) prepared in (1), and then is separated therefrom. Thus, the inorganic layer is separated off By measuring the weight of each sample, the weight per unit area Wc (g/cm$^2$) after the separation using the tape is calculated. The degree of separation x (%)=(Wc−Wb)/(Wa−Wb)×100 is calculated. The separation of the inorganic layer by the mending tape is repeated until x is 20 or less. The sample with x of 20 or less is used as an uncoated sample.

(5) The weight per unit area W (g/cm$^2$) and the thickness D (μm) of each of the coated sample and the uncoated sample are measured.

(6) The press-in amount per unit weight A (cc/g) of each sample in the examples 1 to 14 and the comparative example 1 is measured by a mercury press-in method using Micromeritics WIN9400 series. A mean value of 3 N or more was used as the value of the press-in amount A.

(7) The porosity is calculated based on the formula: porosity P (%)=A/(1/W*D/10000)*100.

Note that the porosity measurement method is not limited to the aforementioned method. Alternatively, the porosity may be measured on each of the base material layer before the formation of the inorganic layer and the separator 6 after the formation of the inorganic layer. "PA−PB" may be calculated by calculating the difference between the porosity of the separator 6 after the formation of the inorganic layer and the porosity of the base material layer before the formation of the inorganic layer.

<Measurement of Capacity Holding Ratio>

A battery having the electrode assembly 2 fabricated as described above (examples 1 to 14 and comparative example 1) was preserved in an 80%-charged state (SOC) at high temperature of 60° C. for 120 days. After that, the capacity holding ratios of the batteries according to the examples 1 to 14 and the comparative example 1 were measured by the following method.

Specifically, the batteries in the examples 1 to 14 and the comparative example 1 were charged up to 4.2 V at constant current of 1 CA. Then, constant-voltage charging was performed at 4.2 V so that the total charge time is 3 hours. After that, the batteries were discharged down to 2.4 V at constant current of 1 CA. The discharge capacity at this time is regarded as the discharge capacity before the high-temperature preservation. Note that 1 CA is the current value at which a fully charged battery is discharged in an hour.

Next, the batteries in the examples 1 to 14 and the comparative example 1 were charged up to the voltage corresponding to 80% of SOC at constant current of 1 CA. After that, the batteries were charged at the voltage with the constant voltage so that the total charge time is 3 hours. Then, the batteries were preserved in a thermostat oven with the temperature kept at 60° C. This test was performed for 120 days.

After that, the batteries were charged up to 4.2 V at a constant current of 1 CA at room temperature. Then, the batteries were charged at 4.2 V with the constant voltage so that the total charge time is 3 hours. After that, the batteries were discharged down to 2.4 V at constant current of 1 CA. The discharge capacity at this time is regarded as the discharge capacity after the preservation. By dividing the discharge capacity after the preservation by the discharge capacity before the preservation, the capacity holding ratio after the preservation was calculated.

Table 1 represents results of measurement of the porosity, the facing ratio, and the capacity holding ratio of the separator in the examples 1 to 14 and the comparative example 1.

TABLE 1

| Example/ Comparative example | A Inorganic layer formation part | B Inorganic layer non-formation part | PA Inorganic layer formation part | PB Inorganic layer non-formation part | PA − PB | Facing ratio (%) | Capacity holding ratio (%) |
|---|---|---|---|---|---|---|---|
| Example 1 | Facing positive electrode | Both sides | 60 | 50 | 10 | 2 | 90 |
| Example 2 | Facing positive electrode | Both sides | 60 | 50 | 10 | 10 | 92 |
| Example 3 | Facing positive electrode | Both sides | 60 | 50 | 10 | 50 | 92 |
| Example 4 | Facing positive electrode | Both sides | 60 | 50 | 10 | 100 | 93 |
| Example 5 | Facing positive electrode | Negative electrode side | 60 | 50 | 10 | 2 | 89 |
| Example 6 | Facing positive electrode | Negative electrode side | 60 | 50 | 10 | 10 | 91 |
| Example 7 | Facing positive electrode | Negative | 60 | 50 | 10 | 50 | 91 |

TABLE 1-continued

| Example/ Comparative example | A Inorganic layer formation part | B Inorganic layer non-formation part | Porosity PA Inorganic layer formation part | Porosity PB Inorganic layer non-formation part | PA − PB | Facing ratio (%) | Capacity holding ratio (%) |
|---|---|---|---|---|---|---|---|
| Example 8 | Facing positive electrode | Negative electrode side | 60 | 50 | 10 | 100 | 92 |
| Example 9 | Facing positive electrode | Positive electrode side | 60 | 50 | 10 | 50 | 91 |
| Example 10 | Facing negative electrode | Both sides | 60 | 50 | 10 | 50 | 92 |
| Example 11 | Both sides | Both sides | 60 | 50 | 10 | 50 | 92 |
| Example 12 | Facing positive electrode | Both sides | 60 | 50 | 10 | 1 | 88 |
| Example 13 | Facing positive electrode | Both sides | 51 | 50 | 1 | 100 | 92 |
| Example 14 | Facing positive electrode | Both sides | 50 | 50 | 0 | 100 | 89 |
| Comparative example 1 | Facing positive electrode | — | 60 | — | — | — | 87 |

As is clear from Table 1, the inorganic layer non-formation parts B at the both ends of the separator 6 have lower porosity than the inorganic layer formation part A in the center of the separator 6. The difference between the porosity of the inorganic layer formation part A and the porosity of the inorganic layer non-formation part B was 46%.

In the examples 1 to 4, the facing ratio is 2% or more. The capacity holding ratios in the examples 1 to 4 are all 90% or more. The facing ratio in the example 12 is 1%. The capacity holding ratio in this example 12 is also larger than that in the comparative example 1. In the comparative example 1, the separator 6 does not have the inorganic layer non-formation part B but has the inorganic layer formation part A on the entire surface.

Note that the present disclosure is not limited to the structure described in the embodiment. The structure of the present disclosure can be modified variously. For example, the secondary battery described in the above embodiment is a winding flat type; however, the secondary battery according to the present disclosure may be a winding cylindrical type or stacked flat type nonaqueous electrolytic secondary battery.

In the secondary battery according to the above embodiment, the current collector foil exposure part 5b of the positive electrode 5 and the current collector foil exposure part 4b of the negative electrode 4 are on the opposite sides and do not face each other. Furthermore, the inorganic layer non-formation parts B of the separator 6 are provided at the both ends of the separator 6 in the width direction. Alternatively, the inorganic layer non-formation part B may be provided on one side of the separator 6. Alternatively, furthermore, the current collector foil exposure part 5b of the positive electrode 5 and the current collector foil exposure part 4b of the negative electrode 4 may be provided on the same side. In this case, the inorganic layer non-formation part B of the separator 6 may be provided on one side of the separator 6 (at one end thereof in the width direction). In this manner, the secondary battery having the separator 6 with the inorganic layer non-formation part B provided on one side also has higher capacity holding ratio than the secondary battery having the separator with the inorganic layer formation part on the entire surface.

A part of the winding type or stacked type electrode assembly 2 other than the end may be provided with the current collector foil exposure parts 4b and 5b and/or an electrode plate having a through hole or the like. In this case, at least 2% of the area of the part of the separator that faces the current collector foil exposure parts 4b and 5b and/or the through hole or the like can be used as the inorganic layer non-formation part B. An active material layer does not exist in the current collector foil exposure parts 4b and 5b and/or the through hole or the like. Therefore, because any inorganic layer is not formed in the part of the separator 6 that faces those structural components, the electrolytic solution penetrates from the inorganic layer non-formation part B to the inorganic layer formation part A that faces the active material layers 4a and 5a and is held therein. Thus, the capacity holding ratio of the secondary battery while the battery is left under high temperature is increased, and the durability of the secondary battery is improved.

The present disclosure can be employed in various batteries such as a lead-acid battery in addition to a lithium ion battery.

The ratio of the width of the part of the inorganic layer non-formation part B that does not face the negative electrode active material layer 4a to the width of the part of the separator 6 that does not face the negative electrode active material layer 4a may be the ratio of the width of the part of the inorganic layer non-formation part B that overlaps with (that faces) the current collector foil exposure part 4b to the width of the part of the separator 6 that overlaps with (that faces) the current collector foil exposure part 4b.

In addition, the ratio of the width of the part of the inorganic layer non-formation part B that does not face the negative electrode active material layer 4a to the width of the part of the separator 6 that does not face the negative electrode active material layer 4a may be the ratio of the width of the inorganic layer non-formation part B to the width of the part of the separator 6 that does not face the negative electrode active material layer 4a.

In the secondary battery depicted in FIG. 1, the inorganic layer non-formation part B may be provided to each of the part on the negative electrode current collector foil exposure part 4b side that does not face the negative electrode active material layer 4a and the part on the positive electrode current collector foil exposure part 5b side that does not face the negative electrode active material layer 4a.

In addition, in the secondary battery depicted in FIG. 1, when it is assumed that the part of the separator 6 that does not face the negative electrode active material layer 4a on the current collector foil exposure part 4b or 5b side of the negative electrode 4 or the positive electrode 5 is 100%, the ratio of the inorganic layer non-formation part B to the part that does not face the negative electrode active material layer 4a is preferably 2% or more.

Moreover, in the present disclosure, the porosity of the inorganic layer non-formation part B can be made lower than that of the inorganic layer formation part A by providing the inorganic layer non-formation part B with low porosity outside the inorganic layer formation part A with high porosity in the separator 6. Thus, the movement of the electrolyte held in the inorganic layer formation part A of the separator 6 between the negative electrode 4 and the positive electrode 5 outward in the width direction of the separator 6 is suppressed and the outflow of the electrolyte into the space between the case 1 and the electrode assembly 2 is suppressed.

The stacked type nonaqueous electrolytic secondary battery depicted in FIG. 7 is formed by alternately stacking the plurality of rectangular negative electrodes 4, positive electrodes 5, and separators 6. The current collector foil exposure part 4b of the negative electrode 4 and the current collector foil exposure part 5b of the positive electrode 5 face in directions opposite to each other. The inorganic layer non-formation part B of the separator 6 is provided on each of the current collector foil exposure part 4b side of the negative electrode 4 and the current collector foil exposure part 5b side of the positive electrode 5. The inorganic layer non-formation part B may be provided either on the side opposite to the current collector foil exposure part 4b or on the side opposite to the current collector foil exposure part 5b, or on the entire periphery.

Moreover, in the stacked type nonaqueous electrolytic secondary battery depicted in FIG. 8, the current collector foil exposure part 4b of the negative electrode 4 and the current collector foil exposure part 5b of the positive electrode 5 face in the vertical direction. Although the inorganic layer non-formation part B of the separator 6 is provided on each of the current collector foil exposure part 4b side of the negative electrode 4 and the current collector foil exposure part 5b side of the positive electrode 5, the inorganic layer non-formation part B may be provided either on the side opposite to the current collector foil exposure part 4b or on the side opposite to the current collector foil exposure part 5b, or on the entire periphery.

Moreover, in the stacked type nonaqueous electrolytic secondary battery depicted in FIG. 9, the current collector foil exposure part 4b of the negative electrode 4 and the current collector foil exposure part 5b of the positive electrode 5 face in the vertical direction. The inorganic layer non-formation part B of the separator 6 is provided on each of the current collector foil exposure part 4b side of the negative electrode 4 and the current collector foil exposure part 5b side of the positive electrode 5, i.e., provided on one side edge of the separator. Alternatively, the inorganic layer non-formation part B may be provided on another side edge or the entire periphery.

An object of the present disclosure is to provide a separator. This separator has simple structure and its porosity can be changed. The separator is highly capable of holding the electrolyte inside the electrode assembly and further has high durability by having high capacity holding ratio when the separator is left under high temperature. Another object of the present disclosure is to provide the nonaqueous electrolytic secondary battery including this separator.

A first separator according to the present disclosure is a separator held between a positive electrode and a negative electrode and including an inorganic layer on at least one surface, in which an inorganic layer non-formation part having no inorganic layers is formed on at least one end.

A first nonaqueous electrolytic secondary battery according to the present disclosure is a so-called winding type and includes an electrode assembly in a case. The electrode assembly is formed by stacking and winding the following components in the longitudinal direction: a positive electrode in which an active material layer including a positive electrode active material and a positive electrode current collector foil exposure part are provided to a positive electrode current collector foil; a negative electrode in which an active material layer including a negative electrode active material and a negative electrode current collector foil exposure part are provided to a negative electrode current collector foil; and a separator including an inorganic layer, held between the positive electrode and the negative electrode, and having the inorganic layer on at least one surface. An electrolyte is held between the positive electrode and the negative electrode. At least one end of the separator in the width direction perpendicular to the longitudinal direction is provided with an inorganic layer non-formation part where the inorganic layer is not formed.

In the first nonaqueous electrolytic secondary battery, it is preferable that the positive electrode current collector foil exposure part of the positive electrode be formed at one end in the width direction, the negative electrode current collector foil exposure part of the negative electrode be formed at an end opposite to the end provided with the positive electrode current collector foil exposure part in the width direction, and the inorganic layer non-formation part of the separator be provided to each end in the width direction.

A second nonaqueous electrolytic secondary battery according to the present disclosure is a so-called stacked type and includes an electrode assembly in a case. The electrode assembly is formed by alternately stacking the following components: a positive electrode in which an active material layer including a positive electrode active material and a positive electrode current collector foil exposure part are provided to a positive electrode current collector foil; a negative electrode in which an active material layer including a negative electrode active material and a negative electrode current collector foil exposure part are provided to a negative electrode current collector foil; and a separator including an inorganic layer, held between the positive electrode and the negative electrode, and having the inorganic layer on at least one surface. An electrolyte is held between the positive electrode and the negative electrode. At least one end of the separator is provided with an inorganic layer non-formation part where the inorganic layer is not formed.

In each of the first and the second nonaqueous electrolytic secondary batteries, it is preferable that the inorganic layer non-formation part be provided to each of a part of the separator that does not face the negative electrode active material layer on the negative electrode current collector foil exposure part side and a part of the separator that does not face the negative electrode active material layer on the positive electrode current collector foil exposure part side.

In addition, the width of the inorganic layer non-formation part to the width of the part of the separator that does not face the negative electrode active material layer on the negative electrode current collector foil exposure part side is preferably 2% or more, and the width of the inorganic layer non-formation part to the width of the part of the separator that does not face the negative electrode active material layer on the positive electrode current collector foil exposure part side is preferably 2% or more.

Moreover, the inorganic layer formation part of the separator is preferably provided to one surface of the separator and the one surface preferably faces the positive electrode or the negative electrode. By providing the inorganic layer on only one surface, the volume of the separator in the battery can be reduced. This can increase the amount of the active material accordingly. Thus, the energy density of the battery can be increased.

Moreover, the porosity of the inorganic layer formation part of the separator is preferably higher than the porosity of the inorganic layer non-formation part thereof. Along with increase in the difference in the porosity between the inorganic layer formation part and the inorganic layer non-formation part, the electrolyte moves more easily from the inorganic layer non-formation part to the inorganic layer formation part. The porosity of the inorganic layer formation part is preferably in the range of 35 to 85%, and more preferably in the range of 45 to 70%. The porosity of the inorganic layer non-formation part is preferably in the range of 30 to 80%, and more preferably in the range of 40 to 60%.

According to the separator of the present disclosure, the inorganic layer non-formation part where the inorganic layer is not formed is provided to at least one end. Therefore, the porosity of the end can be made lower than that of other parts with simple structure in which the inorganic layer is not formed.

According to the first and the second nonaqueous electrolytic secondary batteries of the present disclosure, the inorganic layer non-formation part where the inorganic layer is not formed is provided to at least one end of the separator. Therefore, the porosity of the end can be made lower than that in the center with simple structure in which the inorganic layer is not formed. As a result, the capability to hold the electrolyte inside the electrode assembly is improved. Furthermore, the capacity holding ratio while the battery is left under high temperature can be increased and the durability can be improved.

Moreover, according to the first and the second nonaqueous electrolytic secondary batteries, the inorganic layer non-formation part where the inorganic layer is not formed is provided to each of the part of the separator that does not face the negative electrode active material layer on the negative electrode current collector foil exposure part side and the part of the separator that does not face the negative electrode active material layer on the positive electrode current collector foil exposure part side. Therefore, the porosity of the part that faces the negative electrode active material layer and that contributes to the charge-discharge reaction can be made higher than that of the part that does not face the negative electrode active material layer and that does not contribute to the charge-discharge reaction. As a result, the part that faces the negative electrode active material layer and that contributes to the charge-discharge reaction can hold a sufficient amount of electrolyte.

This can suppress movement of the electrolyte held in the separator outward in the width direction of the separator and suppress outflow thereof into the space between the case and the electrode assembly. As a result, the capability to hold the electrolyte inside the electrode assembly is improved. Moreover, the amount of electrolyte existing outside the electrode assembly and inside the case is reduced drastically. Therefore, the capacity holding ratio during exposure to high temperature is increased. Therefore, the durability is improved.

In addition, in general, use of a battery under high-temperature environment might cause decomposition of the electrolyte in the separator and generate gas. In this case, the gas collection or the like causes shortage of the electrolyte in the electrode assembly and decreases the battery capacity. In the present disclosure, the porosity of the separator at the both ends is low. Therefore, the capillary action easily occurs. Due to this capillary action, the electrolyte in the dead space between the case and the both ends of the electrode assembly is supplied to the inside of the separator. Thus, the capacity holding ratio is increased and the durability is improved.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A nonaqueous electrolytic secondary battery comprising:
    an electrode assembly including:
        a positive electrode having an active material layer including a positive electrode active material and a positive electrode current collector foil exposure part;
        a negative electrode having an active material layer including a negative electrode active material and a negative electrode current collector foil exposure part; and
        a separator held between the positive electrode and the negative electrode;
    a case for housing the electrode assembly; and
    an electrolyte held between the positive electrode and the negative electrode,
    wherein the separator comprising:
        a porous resin film; and
        an inorganic layer formed on a part of a surface of the porous resin film,
    no inorganic layer is formed on a part at an end of the porous resin film,
    the separator includes a part that does not face the negative electrode active material layer on the negative electrode current collector foil exposure part side, and a part that does not face the negative electrode active material layer on the positive electrode current collector foil exposure part side, and
    a ratio of a width of the part of the porous resin film on which no inorganic layer is formed to a width of the part of the porous resin film that does not face the negative electrode active material layer on the negative electrode current collector foil exposure part side is 2% or more and 50% or less and/or a ratio of the width of the part of the porous resin film on which no inorganic layer is formed to a width of the part of the porous resin film that does not face the negative electrode active material layer on the positive electrode current collector foil exposure part side is 2% or more and 50% or less.

2. The nonaqueous electrolytic secondary battery according to claim 1, wherein the electrode assembly includes the positive electrode, the negative electrode, and the separator which are overlapped on one another and wound.

3. The nonaqueous electrolytic secondary battery according to claim 1, wherein the electrode assembly includes a stack of assemblies each including the positive electrode, the negative electrode, and the separator.

4. The nonaqueous electrolytic secondary battery according to claim 1, wherein:
   the positive electrode current collector foil exposure part of the positive electrode is formed at one end of the positive electrode in a width direction;
   the negative electrode current collector foil exposure part of the negative electrode is formed at one end of the negative electrode in a width direction on a side opposite to the positive electrode current collector foil exposure part; and
   the part of the porous resin film on which no inorganic layer is formed is provided to each end of the separator in a width direction.

5. The nonaqueous electrolytic secondary battery according to claim 1, wherein the part of the porous resin film on which the inorganic layer is formed is provided to one surface of the separator and this surface faces the positive electrode or the negative electrode.

6. The nonaqueous electrolytic secondary battery according to claim 1, wherein the part of the porous resin film on which the inorganic layer is formed has higher porosity than the part of the porous resin film on which no inorganic layer not formed.

7. The nonaqueous electrolytic secondary battery according to claim 6, wherein the porosity of the part of the porous resin film on which the inorganic layer is formed is in a range of 35 to 85%.

8. The nonaqueous electrolytic secondary battery according to claim 6, wherein the porosity of the part of the porous resin film on which no inorganic layer is formed is in a range of 30 to 80%.

9. The nonaqueous electrolytic secondary battery according to claim 1, wherein the inorganic layer comprises inorganic particles.

10. The nonaqueous electrolytic secondary battery according to claim 1, wherein the inorganic layer comprises inorganic particles and a binder.

* * * * *